C. M. SAEGER, Jr.
FILTER PRESS.
APPLICATION FILED JULY 11, 1916.
1,232,611.
Patented July 10, 1917.
4 SHEETS—SHEET 3.
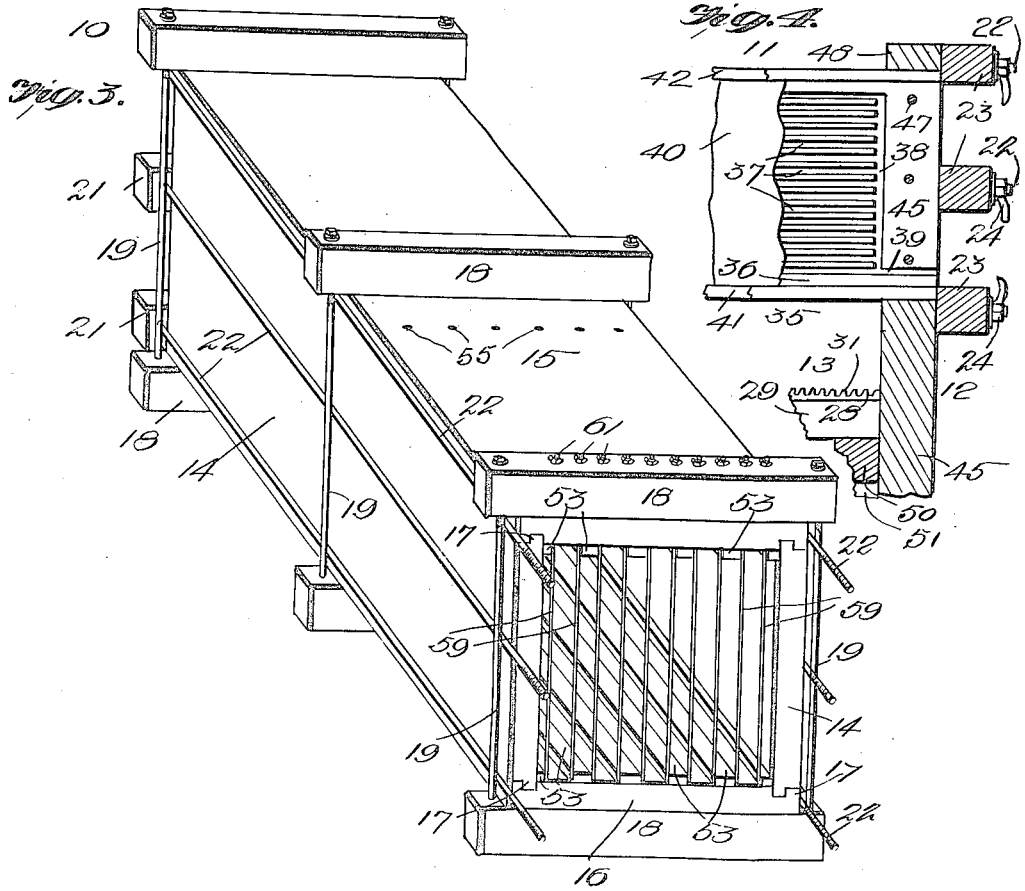
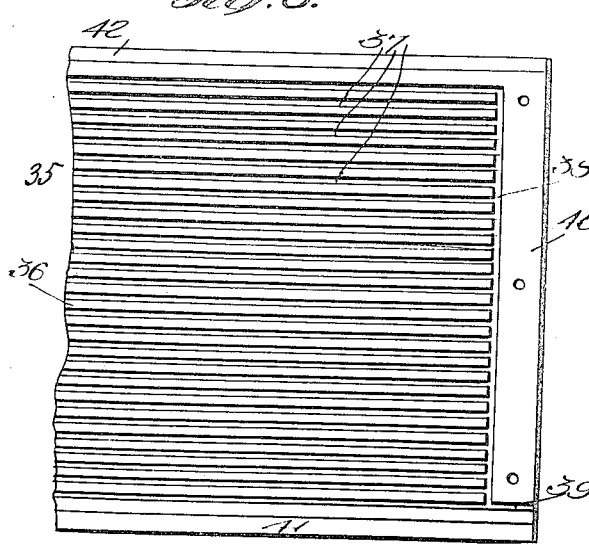
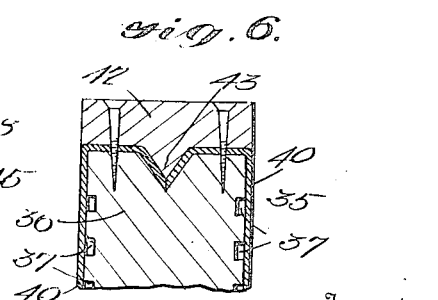
Inventor
C. Marshall Saeger Jr.
By
Attorneys

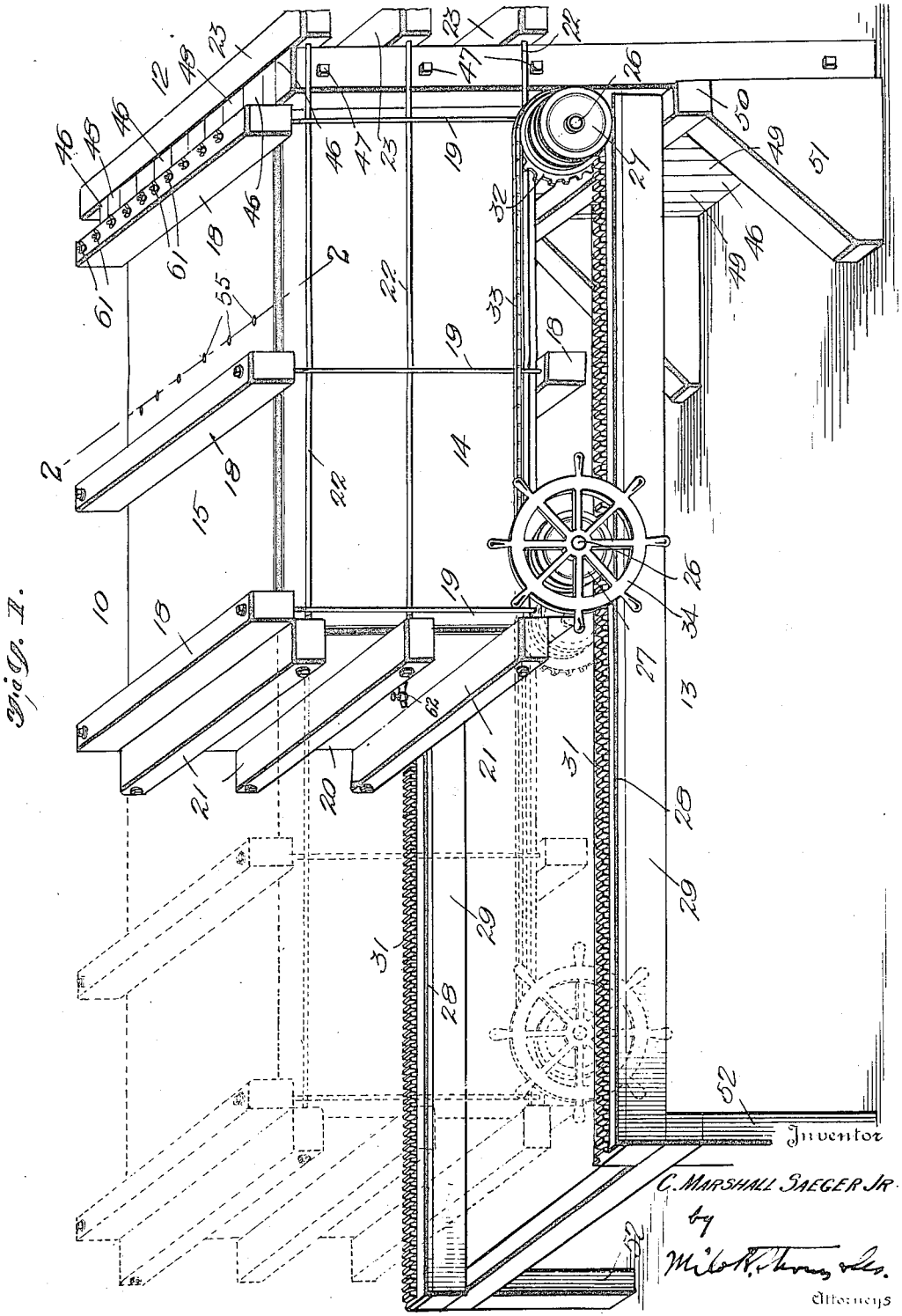

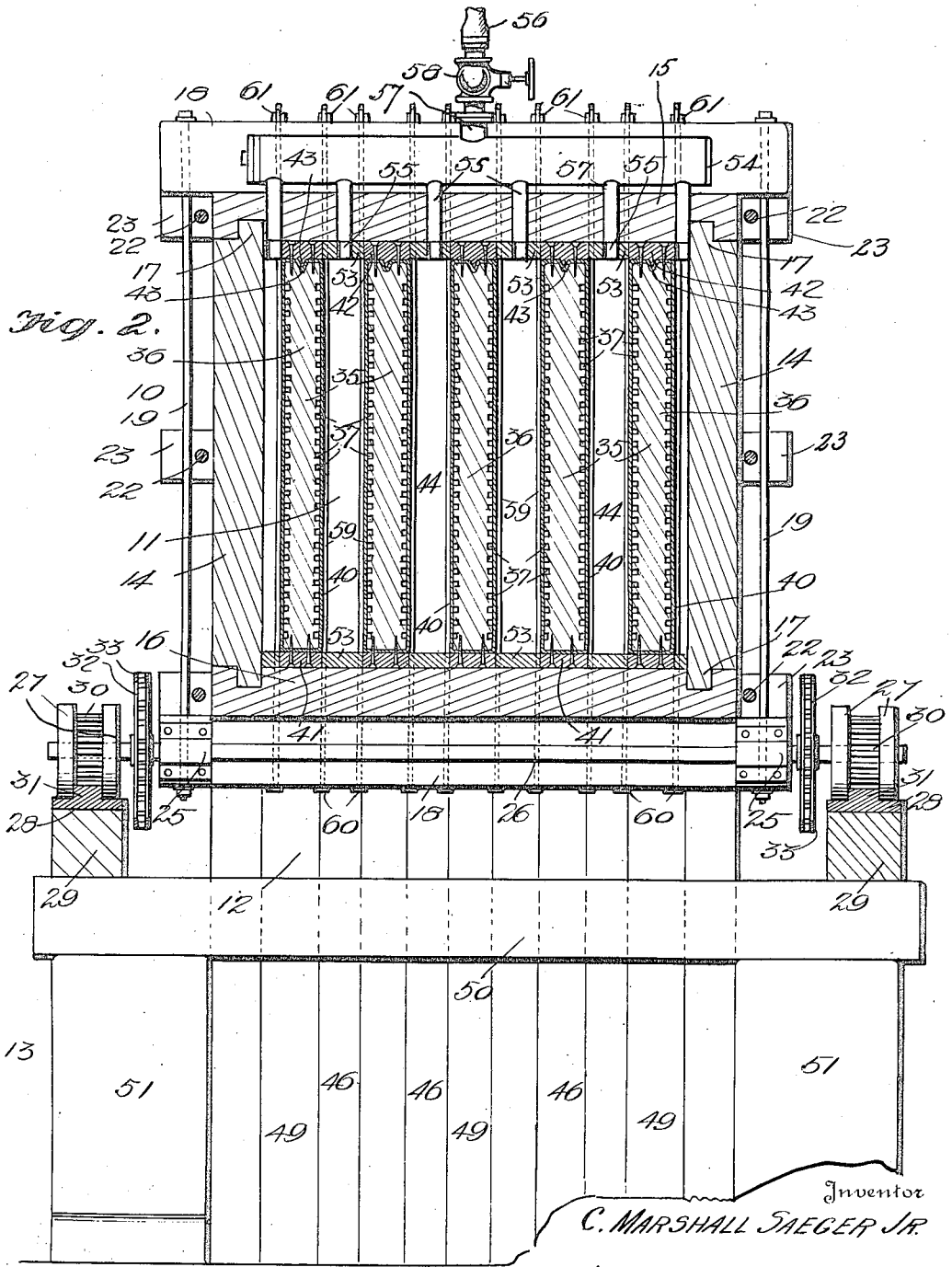

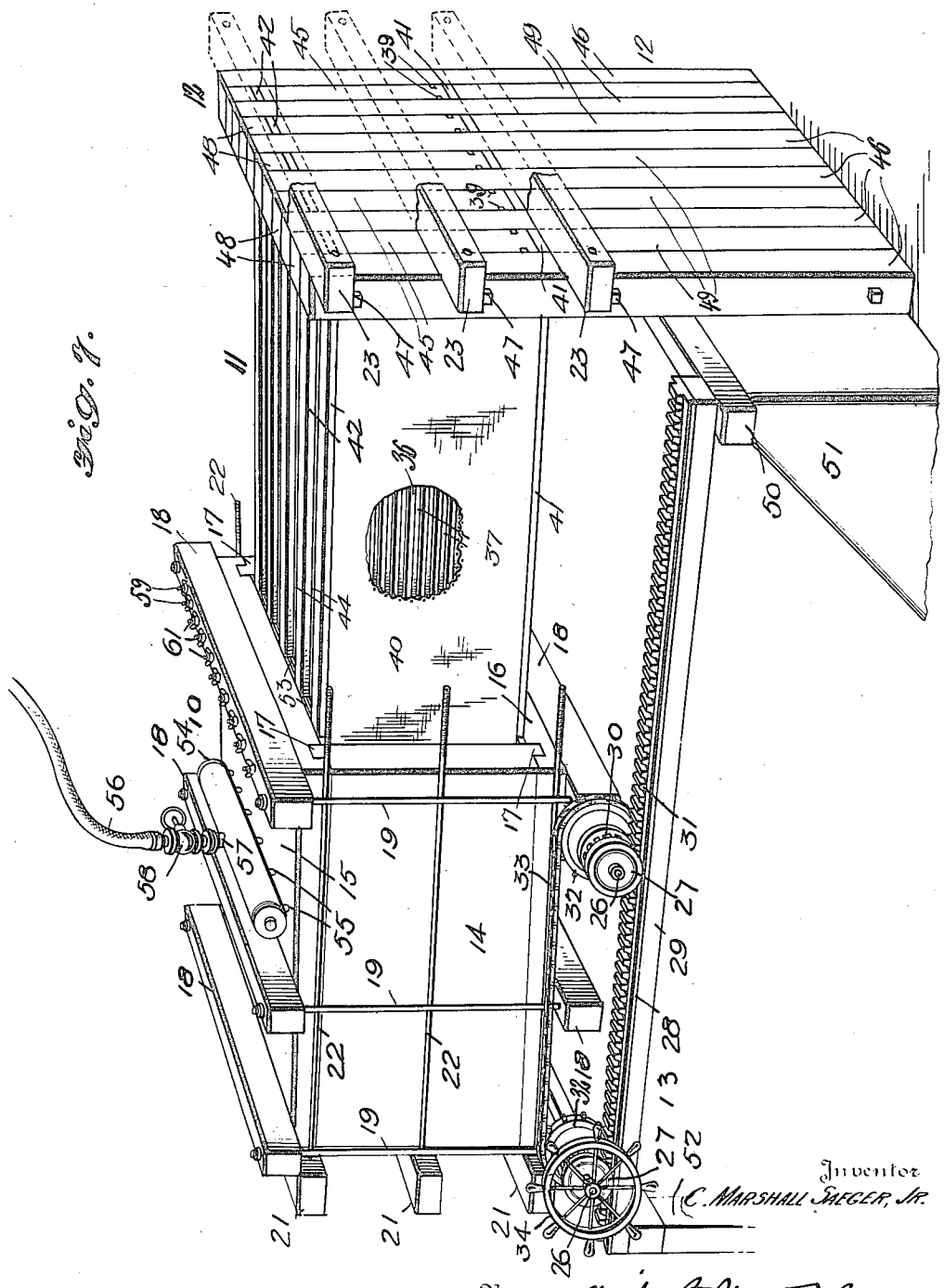

UNITED STATES PATENT OFFICE.

CHARLES MARSHALL SAEGER, JR., OF PALMERTON, PENNSYLVANIA.

FILTER-PRESS.

1,232,611.

Specification of Letters Patent.

Patented July 10, 1917.

Application filed July 11, 1916. Serial No. 108,618.

*To all whom it may concern:*

Be it known that I, CHARLES MARSHALL SAEGER, Jr., a citizen of the United States, residing at 424 Columbia avenue, Palmerton, in the county of Carbon and State of Pennsylvania, have invented new and useful Improvements in Filter-Presses, of which the following is a specification.

This invention relates to a filtering apparatus and particularly to what is known as a filter press for separating solid matter from liquids, and comprises generally a closed tank containing filtering elements from which lead ducts to the outside of the tank for the discharge of the separated liquid, the material to be treated being introduced into the tank under pressure against the sides of the filtering elements upon which sides the solid matter collects, as the fluid passes through the filtering material and cakes, gradually filling the spaces between the filtering elements.

The object of the invention is to provide an apparatus of this class which shall be strong, efficient, simple, of relatively few parts and which can be manufactured and operated at moderate expense.

Another object of the invention is to provide a filter press which shall comprise two main units, the filtering elements and the tank which are movable relatively to each other in a longitudinal direction, the former entering the latter when in operative condition and the union between the two units closed water tight.

A further object of the invention relates to means for automatically cleaning, cutting or scraping the caked solids from the sides of the filter elements whenever the two units are separated, the separated material falling to the ground or into a receptacle below the press as the parts are separated.

A still further object is to provide each filter element with an individual and distinctive outlet that will indicate to an attendant by the condition of the filtrates flowing therefrom if an injury or leak has rendered the filtering material of that particular element inoperatve to produce perfect results, and if so the outlet can be plugged or otherwise closed and the work continued with the remaining elements.

With these as the principal objects in view, the invention consists of the novel construction, combination and arrangement of parts hereinafter described, pointed out in the claims and illustrated in the accompanying drawings, in which;

Figure 1 is a perspective view of the complete press in operative position;

Fig. 2 is a vertical cross sectional view of the same on the line 2—2 of Fig. 1;

Fig. 3 is a perspective view of the tank unit;

Fig. 4 is a longitudinal sectional view of the outlet and of the filtering unit;

Fig. 5 is a side elevation of the outer end of a filter board;

Fig. 6 is a cross sectional view of the top of a filtering element, and Fig. 7 is a perspective view showing the press open, certain parts being shown broken away.

In the drawings, 10 indicates a tank normally closed except at one end which is open to admit the passage of a filtering unit 11 which is rigidly secured at its outlet end to a closure 12 for sealing the open end of the tank when the press is in operative condition. Either the tank 10 or the filtering unit 11 may be a movable unit, in the present instance however the tank is movable and travels longitudinally along a horizontal support 13.

The tank 10 may be of any shape in cross section and made of any suitable material, but is preferably rectangular and made of wood, the vertical sides 14, top 15 and bottom 16 having tongue and groove connections 17 at the corners and tied together by several cross beams 18 above and below the tank connected by rods 19 passing through the projecting ends of the beams, nuts on the threaded ends of said rods serving to draw the beams tightly against the tank. The rear end 20 of the tank is closed in any suitable manner and across this end are several horizontal beams 21 secured thereto, the ends of which project beyond the tank for the passage therethrough of horizontal rods 22 secured by nuts, the opposite ends of the rods being threaded and extended through the ends of beams 23, similar to the beams 21, on the outer side of the closure 12, when the press is ready for filtering, and the parts drawn together to make a fluid tight joint by wing nuts 24 on the ends of the rods 22 that bear against the beams 23.

Bolted on one side of the front and rear beams 18 on the under side of the tank 10 are bearings 25 in which shafts 26 are mounted to revolve, each shaft having a pair of wheels 27 secured on its ends that run on rails 28 bolted on the top of longitudinal beams 29 forming a part of the support 13. Between each pair of wheels 27 is a spur gear wheel 30, said gear wheels engaging racks 31 in the center of rails 28. Keyed on each end of each shaft 26 near the wheels 27 is a sprocket wheel 32, the front and rear sprockets being connected by chain belts 33. The shafts 26 are rotated and the tank 10 moved longitudinally on its wheels 27 by a hand wheel 34 fixed on the end of one shaft which upon being turned, through the sprockets and chains all the wheels are revolved and the gear wheels 30 engaging the racks 31 positively move the tank in the direction of rotation.

The filtering unit 11 comprises a plurality of filtering elements 35 rigidly fastened at their forward or outlet ends to the closure 12 in a manner hereinafter described. Each filtering element consists of a board 36 preferably made of wood and of sufficient thickness to obtain rigidity. These boards are substantially as long as the tank 10 and as wide as the tank is high. In both sides of each board are a plurality of parallel grooves 37 closely associated and extending longitudinally of the board from end to end nearly. Near each end of the board the ends of the grooves 37 on each side are connected by a transverse groove 38, thus providing intercommunication between the grooves. At one corner of the board, which when in position is the lower forward corner, the bottom groove 37 on each side is continued beyond the transverse groove 38 to the end of the board, as at 39, to form outlet passages for the filtering element. Stretched tightly over both sides and the top and bottom edges of the board is the filtering material 40 of canvas or other suitable material, secured by a straight strip 41, nailed or screwed to the bottom edge of the board, and a like strip 42 having a longitudinal rib 43 on its under side fastened to the top edge of said board, the rib fitting into a groove in said edge to assist in tightening the filtering material.

The filtering elements 35 are assembled to form the filtering unit 11 by placing them side by side and sufficiently far apart to provide spaces 44 therebetween for the material to be filtered, and holding them immovable in this position by inserting their forward or outlet ends 45 between vertical posts or timbers 46 and clamping them by a number of rods or long bolts 47. Between the posts 46, above and below the filter elements and bearing against them, are spacers 48 and 49 respectively, the latter extending with the posts 46 to the ground. The posts, filter elements and spacers fit together water tight and form the tank closure 12. A beam 50 extends across the inner side of the posts and spacers and is secured thereto, being braced at its ends by truss blocks 51. The beam 50 also forms a support for the forward ends of the track beams 29, the rear ends of which are carried on posts 52.

The rear end of the filter unit 11 is closed by a tight head that extends entirely across the assembled filter elements 35 and is secured thereto in any suitable manner.

The filter unit 11 being thus held fixed in a horizontal position by the attachment of the closure to the ground and to the support 13, passes into and out of the tank 10 as the latter is moved along said support. The filter elements 35 are guided within the tank as the latter is moved, by spaced strips 53 fastened to the top and bottom of the tank, between which strips the filter elements slide.

Fluids to be filtered are introduced into the tank through the top or rear end as most convenient by means of a manifold 54 from which pipes 55 lead into the tank 10, there being a pipe to deliver the fluids into each space 44 between the filter elements. The fluids are conveyed under pressure to the manifold through any convenient system of piping, here shown as a flexible tube or hose 56 coupled to a nipple 57 or other pipe opening into the manifold and provided with a gate or other valve 58. Instead of a flexible tube, metal pipes having hinge or universal joints may be employed.

An important and necessary requirement in filters of the class to which this invention belongs is a simple, efficient and automatic means for cutting, separating or scraping the caked solid matter from the screening material after the latter have become so clogged by accumulation that fluids cannot pass through. The solid matter is very fine and often very slimy and compacts so closely on the filter cloths as to be impervious to water. When this occurs, the press must be opened and the filtering elements cleaned. This is accomplished automatically when the tank is withdrawn from the filtering unit by the following means.

At the front of the tank are a number of fine, tightly stretched wires 59 that extend vertically across the open end of the tank as clearly shown in Fig. 3. These wires extend downwardly through the bottom 16, and lower front beam 18 and are headed, or have nuts 60 on their lower ends that bear against the beams 18. The upper ends of these wires pass through the top of the tank and the forward beam 18 thereover and have their ends threaded to receive thumb nuts 61 by which the wires are tightened. The wires 59 are spaced apart a distance to bear each on a side of a filtering element and closely against the screening material, so that when the tank is moved rearwardly, the wires, passing over the surfaces of the filtering elements, cut or scrape the solid matters therefrom, which then fall by gravity through the spaces 44 between the screening elements to the ground or into a receptacle placed thereunder. The wires 59 when the press is operating are near the forward ends of the filtering elements 35 just behind the closure 12 so that the entire surface of each element is subject to the scraping or cutting action of the wires by the rearward movement of the tank. The filtering material 40 is stretched tightly and smoothly over the filter boards and so offer no impediment to the operation of the cleaning wires.

In operation, when the press is closed as in Fig. 1, the fluid to be filtered is forced through the flexible tube 56 and when the gate valve is open, through the manifold 54 and pipes 55 leading therefrom into each space 44 between the filtering elements and the sides of the tank, filling the tank with the fluid at any desired pressure. The filtrates pass through the filtering material 40 and are conducted by the grooves 37 to the vertical grooves 38 and thence out of the press through the grooves 39. If a leak or tear in the filtering material of any filtering element be developed during operation, the filtrates of that particular element will disclose the fact by the solid matters contained therein, whereupon, the outlet groove 39 of that particular element is plugged or otherwise closed without interrupting the action of the press.

When the press ceases to operate through the collection of solid matter on the filtering elements, the gate valve 58 is closed to cut off the feed to the tank and the press opened by removing the wing nuts 24 from the ends of the tie rods 22 and then upon turning the hand wheel 34 rearwardly, the wheels 27 are similarly turned by the gearing connecting them and the tank 10 is withdrawn from the filtering unit, the wires 59 scraping the solids from the filtering cloths during the movement. After the solids have fallen to the ground the filtering cloths may be inspected, repaired and further cleaned if necessary and the press closed for another operation.

In order to overcome the vacuum which would be formed when moving the tank 10 rearward, and also to prevent air compression when the tank is being closed or moved forward, its rear end has a vent provided with a valve 62.

I claim:

1. In a filter press, the combination of a longitudinally movable tank having an open end, a closure therefor fixed against movement, a plurality of spaced filtering elements having smooth vertical faces secured on said closure and projecting toward said tank, said filtering elements being adapted to enter and be withdrawn from said tank as the latter is moved, and a plurality of vertical wires crossing the open end of said tank and adapted to engage the vertical faces of the filtering elements and automatically clean them of collected solid matter when the tank is retracted.

2. In a filter press, the combination of a longitudinally movable tank, a fixed closure therefor, a plurality of spaced filter elements having vertical faces secured removably on said closure and projecting toward said tank, said elements each comprising a board grooved on each face and having a single outlet groove for each face, and filtering material stretched smoothly over said grooves, a plurality of cleaning wires stretched vertically across the open end of said tank in contact with the filtering material to clean the same, means for moving said tank toward and away from the closure, means for locking the closure to the tank, and means for introducing the fluid to be filtered into said tank simultaneously against the faces of all the filtering elements.

3. In a filter press, a filtering element therefor, comprising a board having parallel sides, each of which sides has formed therein a number of parallel longitudinal grooves, and a connecting transverse groove at each end, with an outlet groove extending from one of said connecting grooves, filtering material stretched tightly over each grooved side and around the edges of the board, and a retaining strip for said material secured to opposite edges of the board, one of said retaining strips having a projecting rib to assist in tightening said material.

4. In a filter press, the combination of a fixed support, a tank having an open end and movable longitudinally on said support, a closure for said tank rigidly mounted on and projecting upwardly from said support, a plurality of spaced filtering elements secured to said closure and adapted to be inclosed within and withdrawn from said tank by the movement of the latter, means for moving the tank, and cleaner members positioned at the open end of the tank to engage the surface of the filtering elements when the tank is moved.

5. In a filter press, the combination of a fixed support, a longitudinally movable tank on the support and having an open end, a closure for said tank rigidly mounted on one end of said support, a plurality of spaced filtering elements having parallel vertical faces, said elements being fixed on said closure and adapted to be inclosed within and withdrawn from said tank by the movement of the latter, means for moving the tank, means for locking the closure to said tank with the filtering elements therein, and cleaner members positioned at the open end of the tank to engage the surface of the filtering elements when the tank is moved.

6. In a filter press, filtering elements, an inclosing element for the filtering elements, means for moving one of said elements relative to the other to take the filtering elements into and out of the inclosing element, the inclosing element having an opening through which the filtering elements pass, and cleaner members carried by the inclosing element at the aforesaid opening and positioned to engage the surfaces of the filtering elements when said elements emerge from the inclosing element.

7. In a filter press, filtering elements, an inclosing element for the filtering elements, means for moving one of said elements relative to the other to take the filtering elements into and out of the inclosing element, the inclosing element having an opening through which the filtering elements pass, and cleaner members carried by the inclosing element at the aforesaid opening and positioned to engage the surfaces of the filtering elements.

8. In a filter press, a series of spaced filtering elements, an inclosing element for said filtering elements, means for moving one of the elements relative to the other to take the filtering elements into and out of the inclosing element, the inclosing element having an opening through which the filtering elements pass, and a series of transverse scraper members at the aforesaid opening, and positioned to engage the surfaces of the filtering elements.

9. In a filter press, a series of spaced filtering elements, an inclosing element for the filtering elements, means for moving one of the elements relative to the other to take the filtering elements into and out of the inclosing element, the inclosing element having an opening through which the filtering elements pass, and a series of scraper wires carried by the inclosing element and extending across the opening thereof to engage the surfaces of the filtering elements.

10. In a filter press, filtering elements, an inclosing element for the filtering elements, means for moving one of the elements relative to the other to take the filtering elements into and out of the inclosing element, the inclosing element having an opening through which the filtering elements pass, a closure for the inclosing element, said closure carrying the filtering elements, and cleaner members carried by the inclosing element at the aforesaid opening and positioned to engage the surfaces of the filtering elements.

11. In a filter press, a filtering element, an inclosing element for the filtering element, means for moving one of said elements relative to the other, the inclosing element having an opening through which the filtering element passes, and cleaner members carried by the inclosing element adjacent to the aforesaid opening and positioned to engage the surface of the filtering element.

In testimony whereof I affix my signature.

CHARLES MARSHALL SAEGER, Jr.